Aug. 9, 1966　　　F. G. OLSSON　　　3,264,737
HOLDERS FOR NAUTICAL CHARTS AND PLOTTING INSTRUMENTS
Filed Dec. 16, 1963
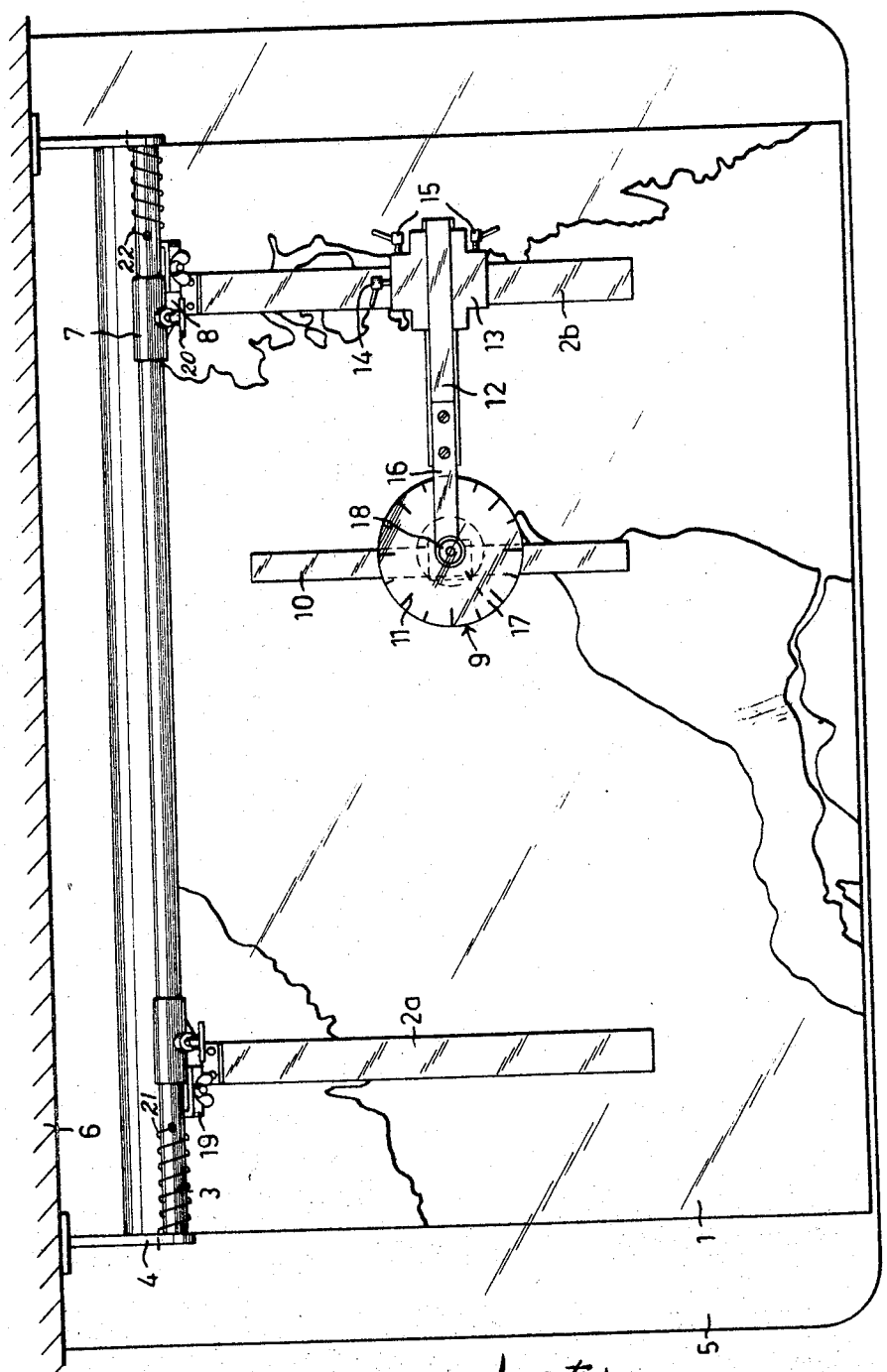

United States Patent Office 3,264,737
Patented August 9, 1966

1

3,264,737
HOLDERS FOR NAUTICAL CHARTS AND
PLOTTING INSTRUMENTS
Fritz Gunnar Olsson, Lundavagen 57D, Malmo C, Sweden
Filed Dec. 16, 1963, Ser. No. 330,920
6 Claims. (Cl. 33—76)

The present invention relates to an arrangement in holders for plotting instruments and nautical charts or other maps for navigation at sea or in the air, which are usually mounted on a board or similar base. The inventive arrangement is characterised primarily in that it comprises two parallel arms resting on the chart and holding it against the board, said arms being laterally displaceable and, to permit exchange of charts, vertically pivotal on a bar which is carried by an element, for instance a wall, to which the board is attached, at least one of said chart-holding arms constituting a guide for a slide associated therewith and carrying an extensible arm which may be displaceable in the slide, said arm extending perpendicularly from the chart-holding arm and forming a holder for a plotting device consisting of a graduated arc associated with said arm and a ruler pivotally associated with said arm.

The inventive arrangement is a simple and extremely convenient aid in holding the customary navigational instruments or air or marine craft, i.e. chart, graduated arc and ruler, in constant readiness on the chart board at precisely the position where they are to be used, and also in holding them in position independently of the ship's motion in heavy sea.

The invention will be described in detail in the following, reference being had to the accompanying drawing which shows by way of example a plan view of a chart board in the chart room of a ship, the chart and the navigational instruments having been placed on the board and being held by the inventive arrangement.

The chart 1 is held by two parallel arms 2a, 2b horizontally displaceably and vertically pivotally associated with a bar 3 which by means of holders 4 is attached to a well 6 supporting the board 5 somewhat above the plane of the board. The wall 6 may be one of the walls of the chart room but may also consist of a ledge attached to the edge of the board. The chart-holding arms 2a, 2b are held to the bar 3 by means of sleeves 7 fitted into the bar and connected with the inner ends of the arms by means of plates 8 extending down from the sleeves to the bar. As can be seen from the drawing, the arms can be retained in desired position along the bar and relative to each other by means of wing nuts 20 engaging the bar 3 with their ends through threaded holes in the sleeves 7.

The chart-holding arms 2a, 2b may be adapted to hold the chart in proper position on the board 5 by their weight but alternatively they may also be adapted to be resiliently urged against the chart by spring means 21 and 22 operative between the bar 3 and the plates 8, or between the bar and its holders 4. In the latter case, the bar can be mounted rotatably with respect to the holders 4, and the arms 2a, 2b may then be non-rotatably connected with the bar through their sleeves 7 for instance by making the bar and the sleeves unround or by interposing a guide between the sleeves and the bar. The swinging movement of the arms is then made possible by the rotatability of the bar.

The plotting device 9 which includes a ruler 10 and a graduated arc 11, is so connected with the chart-holding arm 2b that it can be displaced in all directions along the chart 1. The plotting device is thus carried by an arm 12 which in turn is carried by a slide 13, the arm 12 holding the plotting device being displaceably connected with the slide through a dovetailed connection therewith, and the slide is similarly connected with the chart-holding arm.

2

The arm 12 and the slide 13 can both be locked in desired position by means of locking screws 14 and 15, respectively.

The graduated arc is carried at a given setting position by means of a fitting 16 attached to the arm 12. A screw extending through the fitting and the graduated arc carries beneath the arc a holder 17 for the ruler 10 which is displaceable in the holder. The holder is in turn rotatable with respect to the fitting so that the ruler can be displaced and swung into the desired angular position. After setting, the screw can be locked by means of a nut 18 disposed thereon.

The chart is easily positioned on the board 5 beneath the arms (which must, of course, first be raised) and adjusted to correct position with respect to the movable graduated arc 11 which has been set at a given angular position. After this, there is no risk that the chart and the plotting device can be thrown off the board, as might otherwise happen in heavy sea.

Various modifications of the above described arrangement are possible within the scope of the invention. For example, the graduated arc 11 can be made rotatable and lockable in desired position, whereby an incorrect placing of the chart can be compensated for by adjustment of the graduated arc. Moreover, the two chart-holding arms 2a, 2b may be equipped each with one plotting device which may be convenient for the plotting of cross bearings. In addition, it is possible by choosing a suitable location for the bar 3 relative to the wall or ledge 6 to obtain an easily accessible compartment therebetween for storing the log-book and other nautical literature. Further modifications are indicated in the drawing where reference numeral 19 relates to clamping means on the angular plates 8 of the chart-holding arms 2a, 2b for clamping the edge of the chart as a further precaution for holding it safely to the board.

What I claim and desire to secure by Letters Patent is:
1. Arrangement in holders for plotting instruments and nautical charts or other maps intended for navigation at sea or in the air and placed on a board or similar base, the arrangement comprising supporting means including a bar adapted to be secured to a board or similar base, arm means including two parallel arms resting on the chart and spring loaded to hold it against the base, said arms each being at one of their ends independently slidably and pivotally connected to said bar and extending at right angles thereto, a slide mounted on at least one of said chart-holding arms which constitutes a guide for said chart-holding arms, an extensible arm carried by said slide and extending slide, perpendicularly from said chart-holding arm and forming a holder, a plotting device including a graduated arc member mounted on said extensible arm and a ruler pivotally mounted in relation with said arc member.

2. An arrangement as claimed in claim 1, including locking means for locking the chart-holding arms in any position of displacement on the bar and relative to each other.

3. An arrangement as claimed in claim 1, characterised in that the ruler is both pivotally and displaceably connected to the extensible arm and includes locking means by which said ruler can be locked in any adjusted position.

4. An arrangement as claimed in claim 1, characterised in that the graduated arc member is rotatably connected with the extensible arm and includes locking means by which said arc can be locked in desired angular position.

5. An arrangement as claimed in claim 1, characterised in that the chart-holding arms each carry an extensible plotting arm with a plotting device.

6. An arrangement as claimed in claim 1 including locking means for locking said slide on said parallel arm and said extensible arm to said slide permitting said slide and said plotting device to be locked in any position of displacement with respect to the chart-holding arms and the slide respectively.

References Cited by the Examiner

UNITED STATES PATENTS

| | | | |
|---|---|---|---|
| 474,846 | 5/1892 | Miller et al. | 33—98 |
| 964,773 | 7/1910 | Guillo | 33—76 |
| 1,208,024 | 12/1916 | Sinclair | 33—95 |
| 1,313,520 | 8/1919 | Cole | 33—79 |
| 1,436,415 | 11/1922 | Sullivan | 33—80 |
| 3,115,706 | 12/1963 | Butter | 33—79 |

FOREIGN PATENTS

| | | |
|---|---|---|
| 330,430 | 12/1920 | Germany. |
| 619,007 | 9/1935 | Germany. |
| 324,602 | 2/1935 | Italy. |

LEONARD FORMAN, *Primary Examiner.*

ISAAC LISANN, *Examiner.*

HARRY N. HAROIAN, *Assistant Examiner.*